United States Patent [19]
Held

[11] Patent Number: 4,494,648
[45] Date of Patent: Jan. 22, 1985

[54] DEVICE FOR SUPPORTING PRESS BELTS OR ROLLER-SUPPORTED DOUBLE BELT PRESSES

[76] Inventor: Kurt Held, Alte Strasse 1, D-7218 Trossingen 2, Fed. Rep. of Germany

[21] Appl. No.: 409,186

[22] Filed: Aug. 18, 1982

[30] Foreign Application Priority Data

Sep. 4, 1981 [DE] Fed. Rep. of Germany ....... 3135031

[51] Int. Cl.³ .......................... B30B 5/02; B30B 5/04; B65G 45/02

[52] U.S. Cl. .................................. 198/500; 156/583.5

[58] Field of Search ....................... 198/495, 500, 501; 156/583.5

[56] References Cited

U.S. PATENT DOCUMENTS

| | | | |
|---|---|---|---|
| 2,046,047 | 6/1936 | Watkins | 156/580 |
| 3,671,365 | 6/1972 | Cover, Jr. | 156/580 |
| 3,799,401 | 3/1974 | Braun et al. | 198/500 |
| 3,809,211 | 5/1974 | Padilla | 198/501 |
| 4,149,624 | 4/1979 | Douty et al. | 198/500 |

FOREIGN PATENT DOCUMENTS

| | | |
|---|---|---|
| 356364 | 4/1980 | Austria . |
| 2421296 | 11/1975 | Fed. Rep. of Germany . |
| 2737629 | 2/1979 | Fed. Rep. of Germany . |

*Primary Examiner*—Edward Kimlin
*Assistant Examiner*—Merrell Cashion
*Attorney, Agent, or Firm*—Toren, McGeady and Stanger

[57] ABSTRACT

A device for supporting press belts on a roller-supported double belt press for applying support pressure includes a roller bed, press belts arranged to pass over the roller bed, and a seal between the roller bed and the press belts. The roller bed includes a heating plate with a plurality of laterally spaced support bearing strips located on the heating plate and extending in the direction of movement of the press belts over the roller bed. Shafts extend through spaced openings in the support bearing strips with rollers axially serially arranged on the shafts. Rollers on adjacent shafts are closely spaced apart and are axially offset relative to one another. Filling bodies are positioned between laterally adjacent rollers. Narrow gaps are provided between the rollers and the support bearing strips, between the filling bodies and the press belts, and between the rollers and the heating plate so that the lubricant can be moved through the gaps from the inlet side to the outlet side of the roller bed.

5 Claims, 3 Drawing Figures

DEVICE FOR SUPPORTING PRESS BELTS OR ROLLER-SUPPORTED DOUBLE BELT PRESSES

SUMMARY OF THE INVENTION

The present invention is directed to a device for supporting press belts on a roller supported double belt press for effecting the application of surface pressure. The roller bed includes a heating plate, support bearing strips located on the heating plate and rollers positioned on shafts extending through bearing bores in the support bearing strips. The rollers are closely spaced apart in the lateral direction. Gaps are formed around the rollers and across the roller bed so that a lubricant moves through the gaps from the inlet side to the outlet side of the roller bed.

It has been known to support the press belts, usually made of steel, on commercial roller bearings mounted on the same or separate shafts. The supporting forces are transmitted through lateral support bearings into the machine structure. Examples of such an arrangement are disclosed in the Federal Republic of Germany Offenlegungsschrift 28 53 285, Federal Republic of Germany Patentschrifts 27 35 142; 29 37 971; 29 37 972; 31 23 291; Federal Republic of Germany Offenlegungsschrift 20 37 442; Federal Republic of German Auslegeschrift 1 004 368; Federal Republic of Germany Patentschrift 21 57 746, and Swiss Pat. No. 327 433. A definite disadvantage in such bearing arrangements with large lubricant-wetted areas, is that the entire region of the roller bed operating at above 100° C., which is of particular interest economically, is exposed to a strongly oxidizing atmosphere.

Lubricant films in such areas quickly oxidize or disassociate, further accelerated by the catalytic action of the metallic parts of the machine structure, and form solid residues which increasingly interfere with liquid lubrication so that satisfactory long-term operation cannot be achieved and high costs are experienced for the lubricant and for cleaning the apparatus with a resultant adverse effect on the economic efficiency and availability of such installations.

Therefore, it is the primary object of the present invention to provide a long-lasting liquid or semi-liquid lubrication of the roller bed of a double belt press using inexpensive lubricants or greases while operating at high temperatures with the influence of the oxidizing atmosphere and the operational problems caused by solid residues being avoided.

In accordance with the present invention, communicating gaps are provided from the inlet side to the outlet side of the roller bed so that lubricant introduced at the inlet side is conveyed across the bed to the outlet side carrying any solid residues along with it with the solid residues and lubricant being removed at the outlet side.

In a preferred embodiment, alternating bearing bores and openings are provided in the support bearing strips. In each adjacent pair of a bore and an opening, a bore supports a shaft and the opening provides a passage for a roller bearing with a capillary gap formed between the circumferential periphery of the roller and the surface of the opening for conveying the lubricant through the gap.

In such a pair, the bore and opening are spaced apart in the direction of movement of the press belt over the roller bed.

Another advantageous feature of the invention is the provision of means at the outlet side of the roller bed for collecting the lubricant and returning it to the inlet side.

In accordance with the present invention, the spacing or gap between the individual rollers, their supports and the heating plate of the belt press are limited to the minimum provided by the manufacturing tolerances of the parts forming the roller bed of the double bed press. Furthermore, the spaces between laterally adjacent rollers are filled with filling bodies shaped so that a narrow gap is formed between the fixed and moving parts of the roller bed whereby the gaps become filled with bubble-free liquid lubricant under capillary action, and the lubricant is flushed through the roller bed by the dynamic effect of the moving roller surfaces.

In such an arrangement oxidation of the surfaces of the lubricant-wetted roller bed parts is reduced while the absorption of oxygen in solution in the lubricant continues to take place so that the roller bed is installed as a fluid cushion space, hermetically sealed from the outside, such as in Federal Republic of Germany Offenlegungsschrift 27 37 629, and the resulting roller bed space closed from the outside, incorporates circulating lubrication with suitable liquid or semi-liquid lubricants which are heated to the operating temperature of the double press belt and are maintained under an inert gas atmosphere.

If sufficient lubricant is supplied to the rollers at the inlet side of the roller bed so that it flows in the direction of the movement of the press belts over the roller bed, then not only is atmospheric oxygen precluded as a cause of oxidation, but lubricant containing abrasion and dissociation products and issuing from the outlet side of the roller bed can be collected and discharged or purified and returned to the inlet side.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
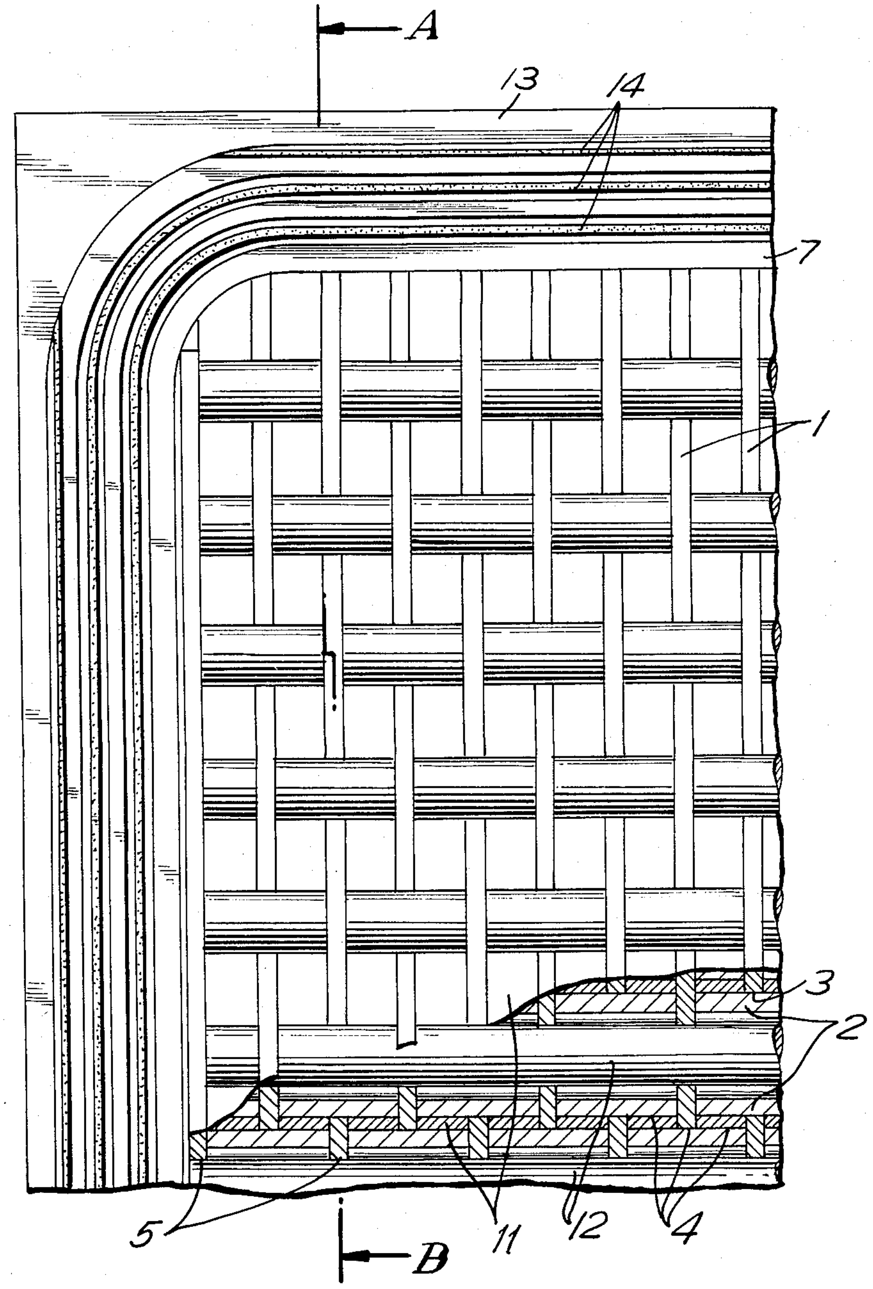
FIG. 1 is a partial plan view, partly in section, schematically illustrating a roller bed embodying the present invention.
Figure 2:
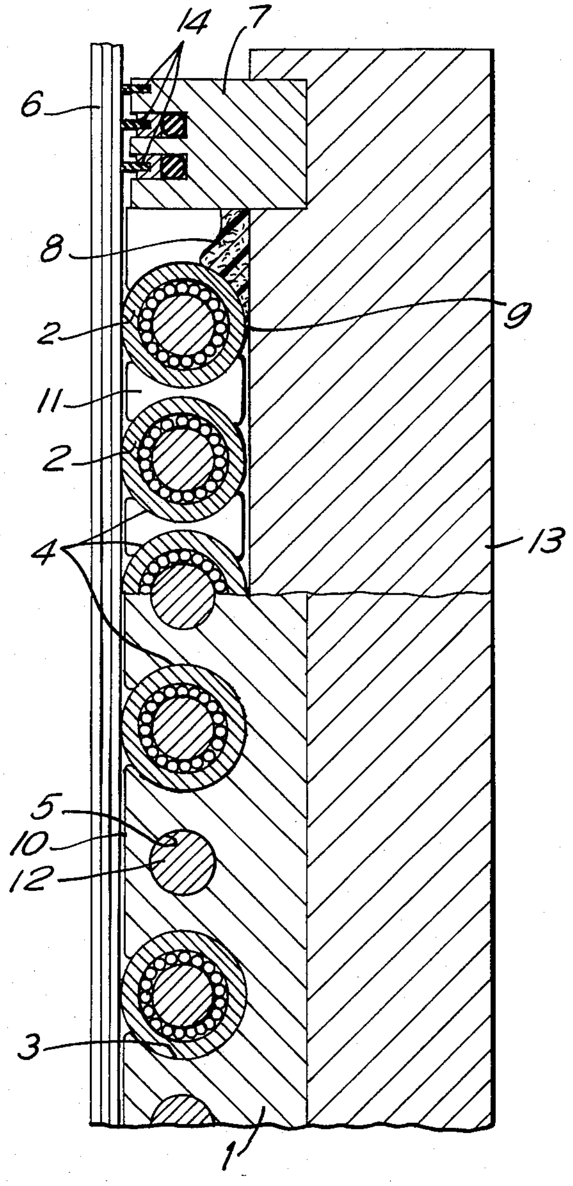
FIG. 2 is a longitudinal sectional view taken along the line A-B in FIG. 1.

In FIG. 1 a portion of a roller bed 7 is shown without the press belts 6, while in FIG. 2 the roller bed 7 is shown with the press belts 6 extending over it. As viewed in FIGS. 1 and 2 the long dimension of the drawing represents the direction in which the press belt 6 moves over the roller bed 7 with the right-hand end of the roller bed viewed in the long dimension direction representing its inlet side that is, the upper end as viewed in FIG. 1. Rollers 2 are arranged in parallel rows extending transversely of the direction of movement of the press belts 6 over the roller bed 7. In each row the rollers 2 are serially arranged in the axial direction extending between support bearing strips 1 located on the heating plate 13. The rollers 2 are positioned on support shafts 12 extending transversely of the bearing strips 1. In adjacent rows the rollers 2 are axially offset relative to one another by half the length of an individual roller.

As can be seen in FIG. 2, in the portion illustrating the section through one bearing strip 1, there are alternating bearing bores 5 and openings 3. The bearing bores 5 receive and support the shafts 12 while the openings 3 each receive one of the rollers 2. Opening 3 is just larger than the diameter of the roller 2 so that a capillary gap 4 is formed between the roller and the surface of the opening. In adjacent bearing strips 1, spaced apart in the direction transverse to the direction of movement of the press belts 6, the bearing bore 5 is opposite an opening 3 in the adjacent bearing strip. Accordingly, each roller 2 extending between a pair of bearing bores 5 extends through an opening 3 at its midpoint.

As can be seen in FIG. 1 the rollers 2 in adjacent rows are offset relative to one another in the axial direction of the rollers. As displayed in the drawing, an opening or space is formed between laterally adjacent rollers and the space is filled by a filling body 11 so that there are narrow spaces or gaps between the rollers and the adjacent filling bodies, support bearing strips 1 and heating plate 13. Accordingly, the width of the capillary gap 4 is selected so that the liquid or semi-liquid lubricant 8 can pass through the gap under capillary action.

As indicated in FIG. 2, the liquid or semi-liquid lubricant 8 can be applied on the belt surface or on the roller surfaces of the first row of rollers 2 at the inlet side of the roller bed 7, so that the lubricant is distributed through the roller gap 9 between the rollers and the heating plate 13 and then flows through the capillary gap 4 to the bearing interstice 10 located between the upper side of the support bearing strips 1 and the filling bodies 11 and the lower side of the press belts 6. The lubricant continues its flow from the inlet side to the outlet side of the roller bed flowing through the various gaps and interstices around the rollers and across the roller bed until the lubricant reaches the outlet side.

Since the lubricant flow effected through the capillary gaps 4, the roller gaps 9 and the bearing interstices 10 continues across the full length of the roller bed from the inlet side to the outlet side, if a sufficient amount of lubricant is supplied at the inlet side it continues to flow in the belt feed direction eliminating atmospheric oxygen as a cause of oxidation. As the lubricant exits from the outlet side of the roller bed, any abrasion or dissociation product can be collected and either discharged or cleansed and returned to the inlet side for recycling through the roller bed.

Seals 14 are provided around the ends and sides of the roller bed for cooperating with the press belts in establishing a seal for the roller bed 7 so that it is hermetically sealed from the outside. With such a hermetic seal formed around the boundaries of the roller bed, a fluid cushion space is established in the roller bed, closed from the outside.

Figure 3:
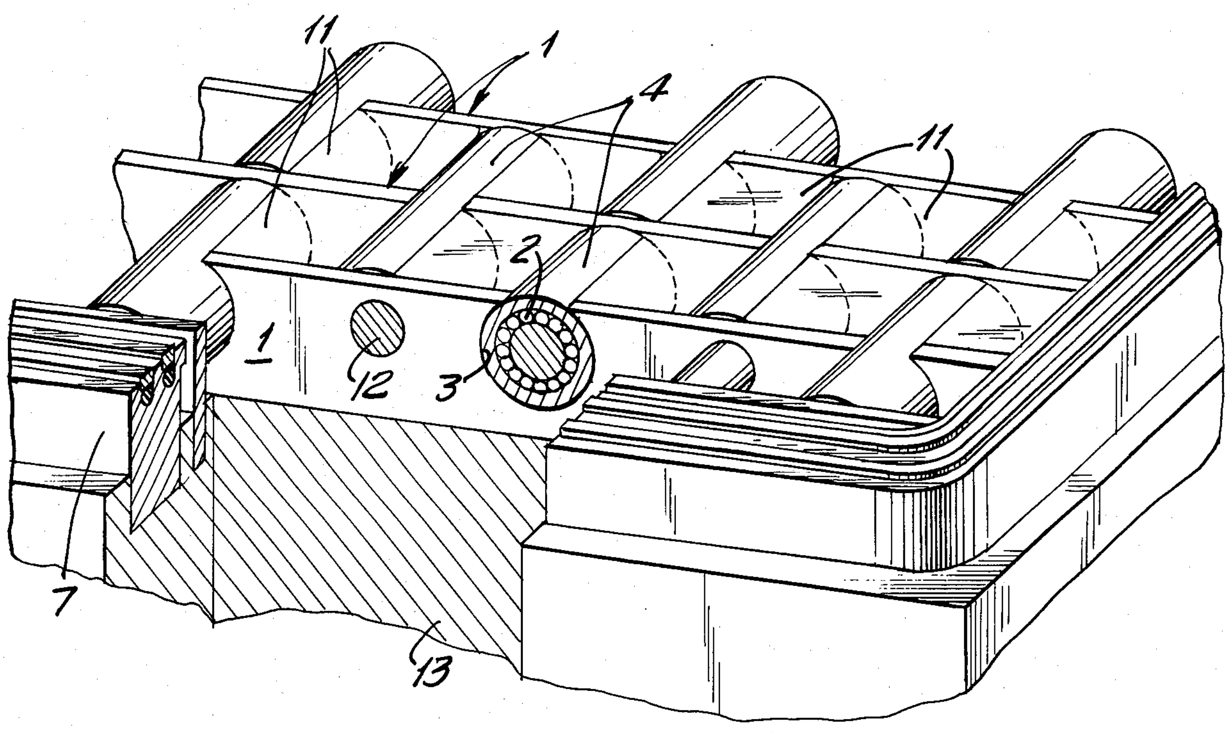
FIG. 3 is a perspective view of a part of the roller bed with portions shown in section.

In FIG. 3 a perspective view is shown of a part of the roller bed 7, note the arrangement of the support bearing strips 1 with respect to the rollers 2 and the support shafts 12. The offset arrangement of the openings 3 in the strips 1 can be noted in this figure.

While specific embodiments of the invention have been shown and described in detail to illustrate the application of the inventive principles, it will be understood that the invention may be embodied otherwise without departing from such principles.

I claim:

1. Device for supporting press belts on a roller-supported double belt press for effecting the application of surface pressure, comprising a roller bed having an inlet end at one end thereof and an outlet end at the opposite end thereof, a press belt arranged to pass over said roller bed in the direction from the inlet end to the outlet end, means for forming a hermetic seal between said roller bed and said press belt, said roller bed comprises a heating plate arranged in spaced relation from said press belt, a plurality of laterally spaced support bearing strips having a first direction and a second direction located on said heating plate and extending in the first direction toward said press belt and in the second direction in the direction between the inlet and outlet ends of said roller bed, said support bearing strips having spaced bearing bores therethrough transversely of the inlet end-outlet end direction of said roller bed and with spaced openings extending therethrough between adjacent said bearing bores, shafts extending across said roller bed transversely of the inlet end-outlet end direction thereof and through said bearing bores extending transversely of the second direction of said support bearing strips with said bearing bores supporting said shafts, a plurality of rollers mounted and serially arranged on each of said shafts, said rollers mounted on adjacent said shafts disposed in spaced relation and the ends of said rollers on adjacent said shafts are offset in the axial direction thereof, filling bodies located in the spaces between said rollers on laterally adjacent said shafts, at least certain of said rollers extending axially through said openings in said support bearing strips with a capillary gap formed between each said roller and the surface of said opening in said support bearing strips through which it extends, said rollers are closely spaced in said roller bed from said heating plate forming a rolling gap therebetween, the surfaces of said support bearing strips and said filling bodies located adjacent to said press belt are spaced from said press belt forming bearing interstices therebetween, and the width of said capillary gaps, rolling gaps, and bearing interstices is limited to a minimum determined by the manufacturing tolerances of the parts forming the device and said roller bed is arranged to receive a lubricant and said hermetic seal permits said lubricant to be flushed through the roller bed passing through said capillary gaps, rolling gaps, and bearing interstices.

2. Device, as set forth in claim 1, wherein said rollers on adjacent said shafts spaced laterally apart are offset relative to one another in the axial direction of said rollers by an amount equal to one-half of the length of said rollers.

3. Device, as set forth in claim 1, wherein in adjacent said support bearing strips the bearing bores in one are in alignment with the openings in the other.

4. Device, as set forth in claims 1, 2 or 3, wherein the lubricant is introduced into the inlet end of said roller bed moving across said roller bed from the inlet end to the outlet end thereof, and means located at the outlet end for collecting the lubricant after its passage through said roller bed from the inlet end thereof.

5. Device, as set forth in claim 4, wherein said means for collecting the lubricant includes means for returning the lubricant to the inlet side of said roller bed.

* * * * *